Dec. 1, 1964 C. H. MUELLER ETAL 3,159,035
WHEEL BALANCER
Filed Nov. 30, 1961 3 Sheets-Sheet 1

Carl H. Mueller,
Rudy F. Schneller,
Inventors.
Koenig, Pope, Senniger and Powers,
Attorneys.

Dec. 1, 1964 C. H. MUELLER ETAL 3,159,035
WHEEL BALANCER
Filed Nov. 30, 1961 3 Sheets-Sheet 2
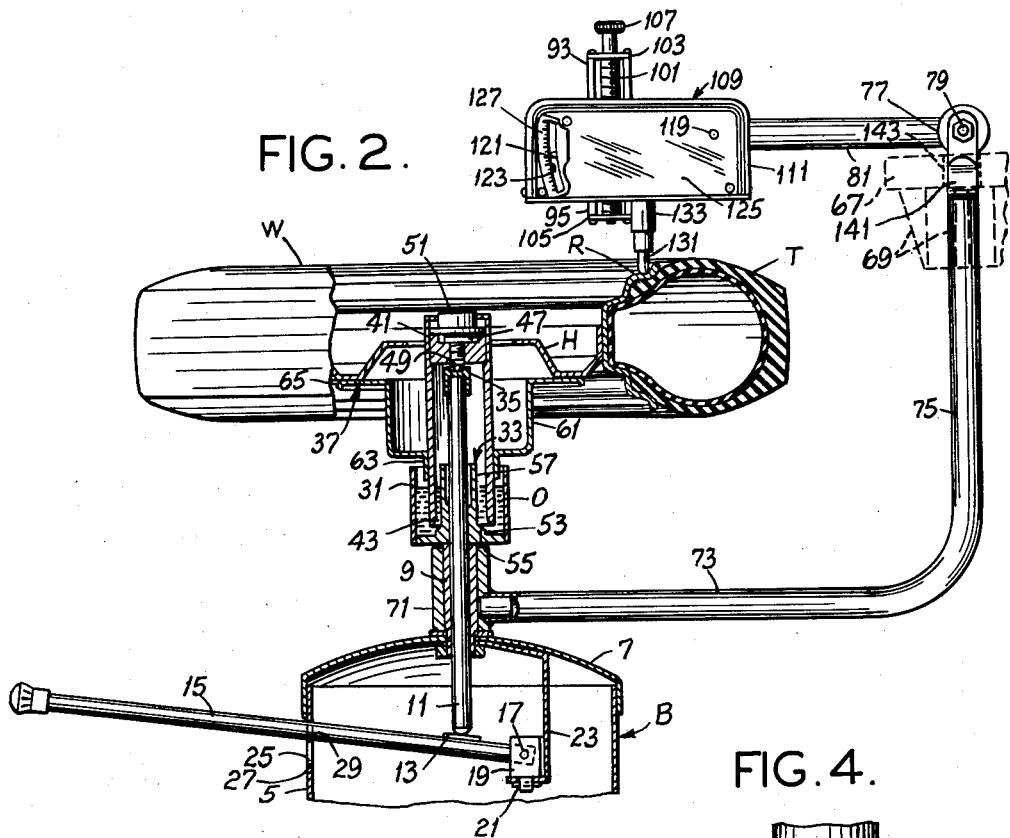
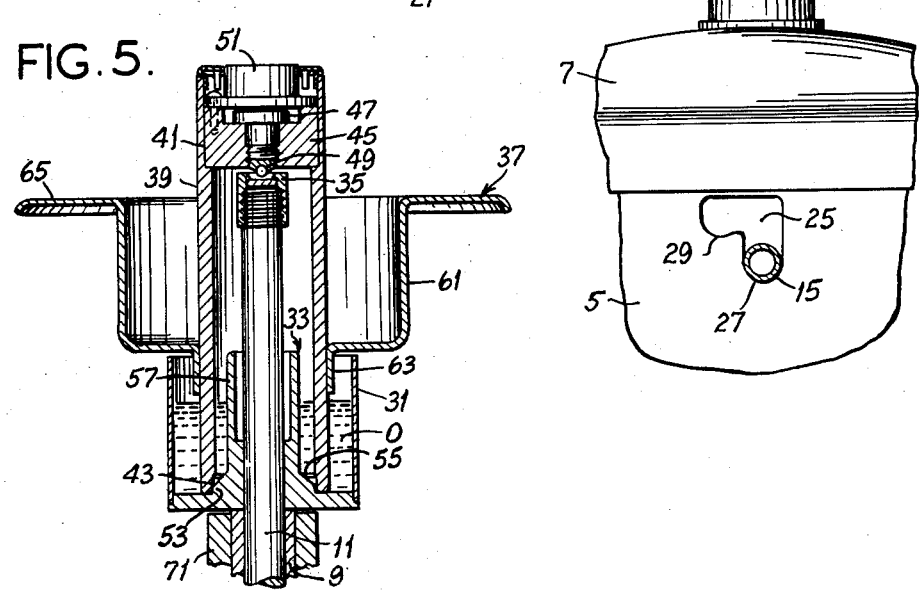

Dec. 1, 1964

C. H. MUELLER ETAL 3,159,035

WHEEL BALANCER

Filed Nov. 30, 1961

3,159,035
WHEEL BALANCER
Carl H. Mueller, Pasadena Hills, and Rudy F. Schneller, O'Fallon, Mo., assignors to The McNeil Machine & Engineering Company, Akron, Ohio, a corporation of Ohio
Filed Nov. 30, 1961, Ser. No. 156,026
14 Claims. (Cl. 73—483)

This invention relates to wheel balancers, and more particularly to such a balancer particularly for wheels of automotive vehicles.

The invention involves improvements on prior static wheel balancers of the type including a tiltable support for a wheel, and a spirit level for indicating the unbalance of a wheel placed on the support, which may be referred to as a "bubble" balancer. In the use of such a balancer, a wheel is centered on the wheel support, and the bubble of the spirit level is observed to determine whether there is any unbalance. If there is an unbalance, a weight is then applied to the wheel to bring it back into static balance.

Among the several objects of this invention may be noted the provision of an improved wheel balancer of the class described adapted for quickly and accurately statically balancing a wheel and including means for accurately measuring the amount of weight needed to correct any static unbalance and accurately indicating the point where the weight should be applied to the wheel to correct the unbalance; the provision of a wheel balancer such as described which includes means engageable with an unbalanced wheel for applying force thereto to bring it to a level position and measuring the force as a measure of the amount of weight needed to correct the unbalance, and for indicating the point on the rim of the wheel where the weight should be applied; and the provision of a wheel balancer having these characteristics which is economical to manufacture, easy to use, and reliable in use. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a vertical section of a wheel balancer of this invention, showing a wheel thereon in phantom;

FIG. 2 is a fragment of FIG. 1, showing certain parts in a different position from FIG. 1, and showing the wheel in section;

FIG. 4 is an enlarged vertical section taken on line 4—4 of FIG. 1;

FIG. 5 is an enlarged fragment of FIG. 1 (without the wheel);

Corresponding reference characters indicate corresponding parts throughout the several views of the drawings.

Figure 1:
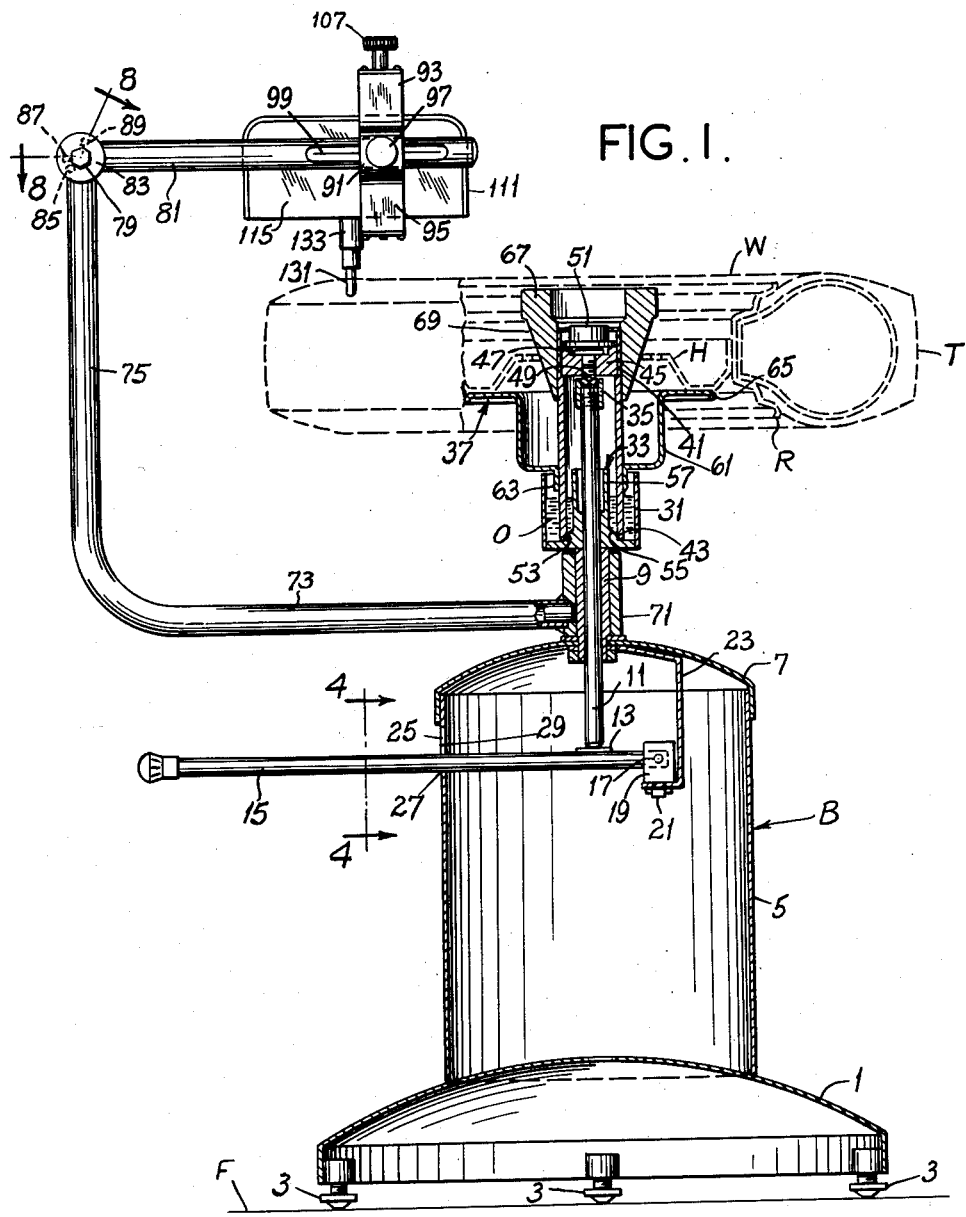

Referring first to FIG. 1 of the drawings, a wheel balancer constructed in accordance with this invention is shown to comprise a base designated in its entirety by reference character B. This includes a bottom member 1 on leveling screws 3. Extending upward from the bottom member is a cylindrical sheet metal housing 5 having a cover 7. Fixed in a hole at the center of the cover and extending upward from the cover is a short tubular post 9. This constitutes a guide for a vertically slidable rod 11. The rod extends down into housing 5 and its lower end engages a pad 13 on a hand lever 15 for raising and lowering the rod. Lever 15 has one end pivoted at 17 for swinging on a horizontal axis on a pivot block 19. This block is pivoted at 21 for swinging on a vertical axis on a bracket 23 extending down from the cover. Lever 15 extends through a stepped slot 25 (see FIG. 4) at one side of housing 5. With the lever on the low step 27 of the slot, rod 11 occupies the lowered position in which it appears in FIGS. 1 and 5. By raising the lever and swinging it laterally on to the high step 29 of the slot, the rod is lifted to the raised position in which it appears in FIG. 2.

Seated on the upper end of post 9 surrounding rod 11 is an annular oil cup 31. Oil contained in this cup is indicated at O. Rod 11 is vertically slidable in the central portion 33 of this cup. It extends up above the cup, and has a ball seat 35 at its upper end. A wheel carrier designated in its entirety by reference character 37 is mounted on the ball seat at the upper end of rod 11 for universal tilting movement in respect to the vertical axis of the rod. The wheel carrier comprises a tubular cylindrical body 39 having counterbores 41 and 43 at its upper and lower ends. A head 45 is secured in the lower end of the upper counterbore 41 as by press-fitting. A screw 47 is threaded in a center hole in head 45. This screw has a tapered lower end provided with a recess for a ball 49 which bears on the ball seat 35. A circular spirit level 51 is secured on head 45 within the upper counterbore.

The tubular cylindrical wheel carrier body 39 extends down into the oil O in the annular oil cup 31, surrounding the central portion 33 of the cup. The central portion 33 of the cup has a lower cylindrical section 53 having a diameter slightly less than the diameter of the lower counterbore 43 in body 39, a conical section 55 immediately above section 53, and an upper cylindrical section 57 of reduced diameter. The lower end of body 39 is internally bevelled. When rod 11 is lowered, body 39 is lowered along with the rod. The bevelled lower end of body 39 engages conical section 55 to center the body relative to cylindrical section 53, and finally the lower end of the body slides down around cylindrical section 53 and engages the bottom of the cup 31 (see FIGS. 1 and 5). When the rod 11 is raised, body 39 is raised along with the rod, and its lower end is raised from the bottom of the cup to free body 39 for universal tilting movement in respect to the vertical axis of the rod (see FIG. 2). The upper cylindrical section 57 of portion 33 of the cup 31 has an external diameter smaller than the internal diameter of body 39 to permit such tilting. When rod 11 is in lowered position, there is clearance between the ball 49 and the ball seat 35 to avoid damage thereto when the balancer is not in use, and when a wheel is placed on or removed from the balancer, and when balancing weights are being hammered on.

Secured to the cylindrical body 39 is a cup-shaped element 61. This has a central opening in the bottom and an annular flange 63 extending down from the bottom surrounding and secured to the body 39, and an outwardly projecting horizontal rim 65 at the top constituting an annular platform for supporting a wheel W. The cup-shaped element 61 is secured to the cylindrical body 39 in such position as to be sufficiently clear of the rim of the oil cup 31 when the rod 11 and body 39 are raised as to allow for tilting of wheel carrier 37. It will be understood that wheel W comprises the usual hub H and rim R with tire T on the rim, and that it is placed on the wheel-supporting annular platform 65 of element 61.

It then needs to be centered in respect to the axis of wheel carrier 37. For this purpose, a wheel centering member 67 is provided. This consists of a tubular body having a sliding fit on the cylindrical wheel carrier body 39 and provided with a plurality of external ribs 69, the outer faces of which are on the surface of a cone. This is completely removed for placing a wheel on annular platform 65, and then it is applied to body 39 with its narrow end downward and pressed downward into the hub H of the wheel to center the wheel on carrier 37. When member 67 is so pressed down, the wheel W readily slides horizontally on annular platform 65 as required for centering.

Figure 3:
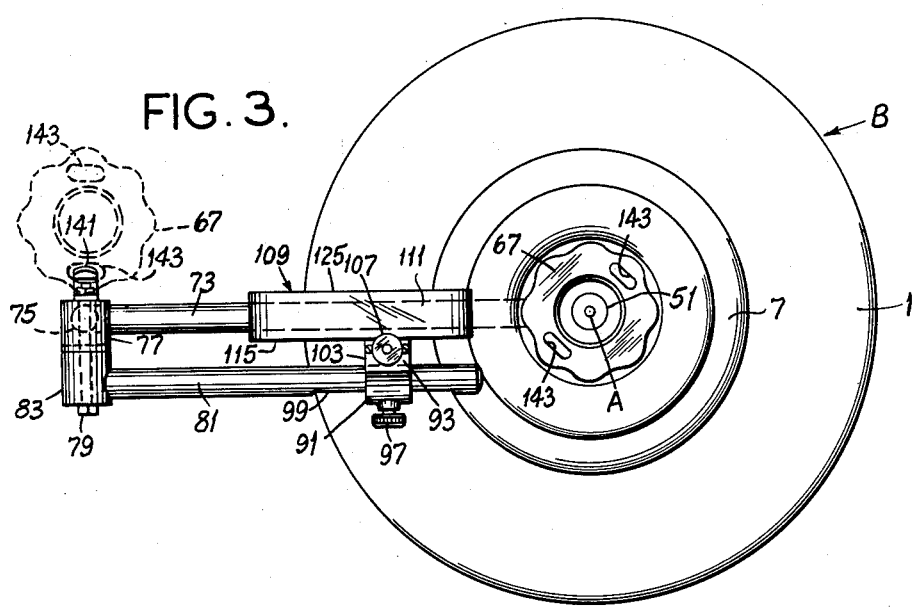
FIG. 3 is a plan of FIG. 1 (without the wheel)
Figure 7:
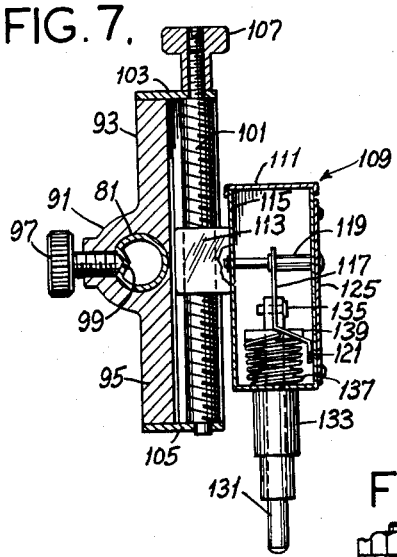
FIG. 7 is a vertical section taken on line 7—7 of FIG. 6.
Figure 6:
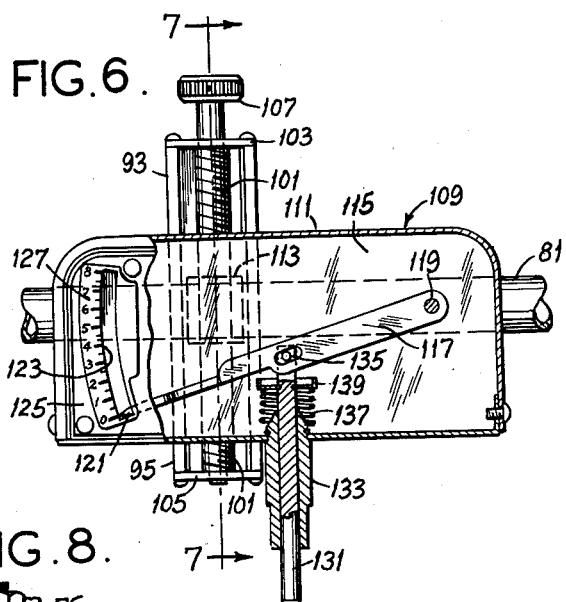
FIG. 6 is an enlarged fragment of FIG. 2 with certain parts broken away and shown in section.
Figure 8:
FIG. 8 is an enlarged section taken on line 8—8 of FIG. 1.
Figure 9:
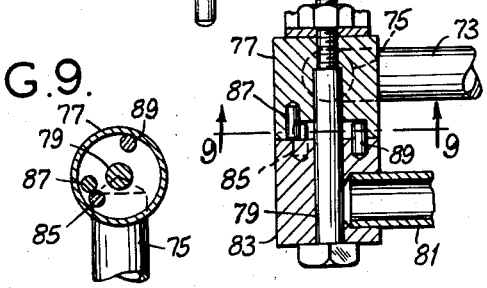
FIG. 9 is a vertical section taken on line 9—9 of FIG. 8.

Journalled on post 9 is a sleeve 71. An arm 73 extends laterally outward from this sleeve and has an upwardly extending outer end portion 75. The upper end of the latter in located above the level of a wheel W supported on wheel carrier 37. Arm 73 has a cylindric head 77 (see FIGS. 3 and 8) fixed on its upper end. This receives a bolt 79 constituting a horizontal pivot for an arm 81, the latter having a cylindric hub 83 at one end receiving the bolt. Arm 81 is swingable downward to the generally horizontal position in which it appears in FIGS. 1–3, which is determined by engagement of a pin 85 on hub 83 with a stop pin 87 on head 77, and is swingable upward to a retracted position determined by engagement of another pin 89 on hub 83 with pin 87.

Slidable on arm 81 lengthwise thereof is a bracket 91 having upwardly and downwardly extending arms 93 and 95. This is adapted to be locked at various positions of adjustment lengthwise of arm 81 by a set screw 97. Arm 81 is formed from a tube, and has an elongate narrow indentation 99 extending lengthwise thereof receiving the end of the set screw for holding bracket 91 from rotating on arm 81. A screw 101 is journalled for rotation in plates 103 and 105 secured to the ends of and extending laterally from arms 93 and 95 on the bracket. Screw 101 has a knob 107 at its upper end above plate 103.

Screw 101 carries a force-measuring gage designated in its entirety by the reference character 109. This gage comprises a case 111 having a nut 113 on one side wall 115 thereof in which the screw 101 is threaded, the arrangement being such that by turning the screw one way or the other, the gage may be lowered and raised. A lever 117 is pivoted at one end thereof on a horizontal pin 119 extending between the side walls of the case, and has an offset free end portion 121 visible through an arcuate slot 123 in the other side wall 125 of the case constituting a pointer adapted to sweep over scale markings 127 on the outside of side wall 125. A pusher constituted by a plunger 131 is vertically slidable in a guide 133 in the bottom of the case, and has a pin and slot connection as indicated at 135 at its upper end with the lever. A coil tension spring 137 having its lower end secured to the upper end of guide 133 and its upper end secured to a washer 139 on the plunger biases the plunger and lever 117 downward toward the zero position of pointer 121 on the scale 127. The gage is calibrated in terms of ounces.

It will be understood that leveling screws 3 are used to level the wheel balancer on floor F so that the wheel carrier, without a wheel thereon, is balanced as indicated by centering of bubble A of spirit level 51. The operation of balancing a wheel W starts with rod 11 in the lowered position of FIGS. 1 and 5. The lower end of cylindrical body 39 of wheel carrier 37 is therefore seated against the bottom of oil cup 31 surrounding cylindrical section 53 of central portion 33 of the cup, holding the wheel carrier steady. With arm 81 swung back and the wheel centering cone 67 off the carrier 37, the wheel W is placed on annular platform 65 of carrier 37 and roughly centered with respect thereto. Then, cone 67 is applied to the upper end of body 39 of carrier 37, extending through the hole in the wheel hub H, and pressed down accurately to center the wheel in respect to the axis of carrier 37. As previously mentioned, the wheel readily slides horizontally on annular platform 65 as required for accurate centering. The cone is removed (so that any unbalance of the cone which may exist does not affect the operation of balancing the wheel), and it may be conveniently hung on a hook 141 provided for the purpose on the end of bolt 79 projecting from head 77, the cone having slots 143 for receiving the hook. It will be understood, however, that if the cone is balanced, it may be left in place during the wheel balancing operation.

Lever 15 is raised on to the high step 29 of slot 25 to raise rod 11 and wheel carrier 37, thereby freeing the latter for universal tilting movement on the upper end of the rod. If the wheel is unbalanced, it will tilt down on its heavy side. Tendency of the wheel to wobble is damped by action of oil O in cup 31 on the lower end of body 39 of the wheel carrier, the oil being sufficiently viscous for this purpose. When the wheel has come to rest, the unbalance is observed by observing the position of bubble A of the spirit level, it being readily understood that the bubble will be located radially outward of the bull's eye of the level in the direction toward the high side of the tilted wheel.

Arm 81 is swung down to its generally horizontal position, gage 109 being raised on screw 101 at this time so that the lower end of pusher 131 does not engage the wheel. Arms 73 and 81 are then rotated around the axis of post 9 to bring arm 81 around to the high side of the tilted wheel, as nearly as possible as can be determined by eye to a position where pusher 131 is at least approximately on the radius of the displaced bubble A. As shown in FIG. 2, arm 81 has been brought around to the right side of the wheel (the wheel being one that is heavy on the left side of FIG. 2). Gage 109 is adjusted along arm 81 to position pusher 131 of the gage over rim R of the wheel, and held in adjusted position by set screw 97. Screw 101 is turned by knob 107 to lower the gage, and this is continued to cause the lower end of the pusher to engage the rim and exert force on the wheel.

The force exerted by pusher 131 on the rim of the wheel at the high side of the wheel causes the wheel (and carrier 37) to tilt back toward level position. Assuming the pusher has been initially positioned precisely on the radius of the displaced bubble, the bubble may be brought back precisely to center by lowering the gage. Assuming that the pusher has been initially positioned somewhat off the radius of bubble displacement (as is usually the case, since the initial positioning of the pusher is by eye), the bubble is brought back approximately to center by lowering the gage. Then, readjustment is made precisely to center the bubble by rotating arms 73 and 81 one way or the other (usually only a slight amount of rotation is needed) to shift the pusher one way or the other around the rim of the wheel, and turning the screw 101 to readjust the gage, if necessary. With the bubble precisely centered, the pointer 121 of the gage is observed to determine the amount of weight needed for correcting the unbalance and the position of the pusher is the precise point where the weight should be applied to the rim for correcting the unbalance.

With pusher 131 yieldingly bearing on the rim of the wheel during the adjustment of the gage, an extra damping effect is added to the damping effect of oil O to damp the tendency of the wheel to wobble.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is:

1. A wheel balancer comprising a base, a rod extending upward from the base, a wheel carrier mounted for universal tilting movement with respect to the vertical axis of the rod on the upper end of the rod and adapted to have a wheel centered thereon, said carrier being adapted to occupy a balanced level position and being tiltable therefrom in response to unbalance of a wheel thereon, a spirit level on the carrier for indicating tilting in any direction of the carrier, a first arm mounted on the base for rotation around the axis of the rod, a second arm carried by the first arm for movement between a retracted position for application of a wheel to the carrier and an operative position extending generally horizontally over a wheel on the carrier, a bracket on the second arm, a force-measuring gage carried by the bracket for generally vertical movement relative to the bracket when the second arm is in its operative position, said gage comprising a pusher having an end engageable with a wheel on the carrier, spring means biasing the pusher to an extended position, and means for indicating the amount of force applied to the pusher against the bias of said spring means, said gage being movable relative to the bracket for application of force to the wheel by the pusher at such a point and in such amount as to bring the carrier and wheel thereon to level position and for measuring the amount of said force, thereby to indicate the amount of weight and the position thereof required to balance the wheel.

2. A wheel balancer as set forth in claim 1 wherein said bracket carries a screw and said gage is movable relative to the bracket by turning the screw.

3. A wheel balancer as set forth in claim 1 wherein said bracket is adjustable to different positions longitudinally on said second arm.

4. A wheel balancer as set forth in claim 1 wherein said first arm has an upwardly extending end portion and said second arm is pivoted at the upper end of said end portion of the first arm for swinging movement on a horizontal axis transverse to said arms, said second arm being swingable on its pivot between its said retracted and operative positions, and wherein stop means is provided for determining said positions.

5. A wheel balancer as set forth in claim 1 wherein said rod is vertically movable relative to the base between a lowered position wherein said carrier engages the base to hold it against tilting and a raised position wherein the carrier is free of the base to allow it to tilt.

6. A wheel balancer as set forth in claim 5 wherein the base carries an oil cup and the carrier has a portion extending down into the oil in the cup for damping the carrier when in raised position.

7. A wheel balancer as set forth in claim 5 wherein said carrier comprises a tubular cylindrical body having a head in its upper end mounted for universal tilting movement on the upper end of said rod, the spirit level being located above the head, and a cup-shaped element mounted on said body having a rim constituting an annular platform for supporting a wheel, the wheel being adapted to be centered on the carrier by sliding a centering cone downward on said body when the rod and carrier are in lowered position.

8. A wheel balancer as set forth in claim 7 wherein the base carries an annular oil cup surrounding said rod, the lower end of said carrier body extending down into said cup, and engaging the bottom of said cup when the rod and carrier are in lowered position.

9. A wheel balancer comprising a base, a wheel carrier support extending upward from the base, a wheel carrier mounted for universal tilting movement with respect to the vertical axis of said wheel carrier support on the upper end of said wheel carrier support and adapted to occupy a balanced level position and being tiltable therefrom in response to unbalance of a wheel thereon, means on the carrier for indicating tilting in any direction of the carrier, a force-measuring gage comprising a pusher engageable with a wheel on the carrier, means biasing the pusher to an extended position, means for indicating the amount of force applied to the pusher against the bias of said biasing means, and means carried by the base mounting said gage for rotation around the axis of the wheel to different positions wherein the gage is above the wheel with the pusher extending downward for engagement of its lower end with the wheel and also mounting said gage for downward movement toward the wheel whereby the pusher is adapted to apply force to the wheel at such a point and in such amount as to bring the carrier and wheel to level position and the amount of said force is indicated by said gage, thereby to indicate the amount of weight and the position thereof required to balance the wheel.

10. A wheel balancer as set forth in claim 9 wherein said gage mounting means also mounts the gage for adjustment radially of the wheel and movement between a retracted position clear of the carrier for application of a wheel thereto and an operative position above the wheel.

11. A wheel balancer as set forth in claim 10 wherein said gage mounting means comprises a first arm mounted on the base for rotation around the vertical axis of said wheel carrier support, and a second arm carried by the first arm for movement between a retracted position clear of the carrier and an operative position wherein the gage is above the wheel, the gage being adjustable lengthwise along said second arm and movable relative to said second arm for downward movement toward the wheel when said second arm is in its said operative position.

12. A wheel balancer as set forth in claim 11 wherein said second arm is pivoted on said first arm for swinging it upward away from said wheel carrier.

13. A wheel balancer as set forth in claim 9 wherein said wheel carrier support is vertically movable relative to the base between a lowered position wherein said carrier engages the base to hold it against tilting and a raised position wherein the carrier is free of the base to allow it to tilt.

14. A wheel balancer as set forth in claim 13 wherein the base carries an oil cup and the carrier has a portion extending down into the oil in the cup for damping the carrier when in raised position.

References Cited in the file of this patent
UNITED STATES PATENTS

| | | |
|---|---|---|
| 453,573 | Beery | June 2, 1891 |
| 531,487 | Vauclain | Dec. 25, 1894 |
| 714,477 | Haenze | Nov. 25, 1902 |
| 1,774,718 | McCabe | Sept. 2, 1930 |
| 2,592,804 | Holl | Apr. 15, 1952 |
| 2,718,781 | Kiebert | Sept. 27, 1955 |
| 2,909,063 | Bageman | Oct. 20, 1959 |
| 3,017,774 | Thompson | Jan. 23, 1962 |
| 3,039,314 | Smith | June 19, 1962 |